April 13, 1926.  
G. U. COZZOLINO ET AL  
1,580,414  
BICYCLE OR LIKE FRAME  
Filed March 1, 1924
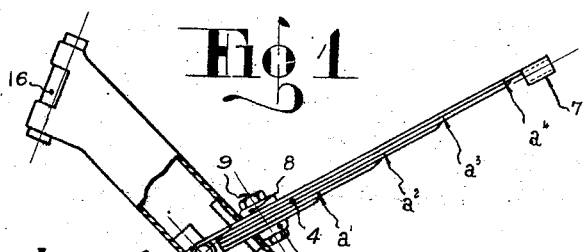
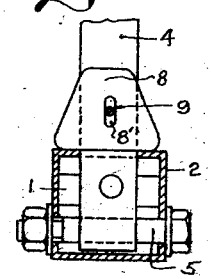
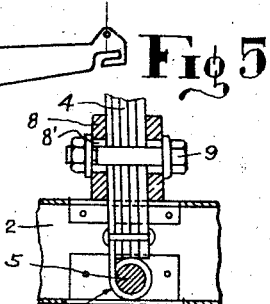
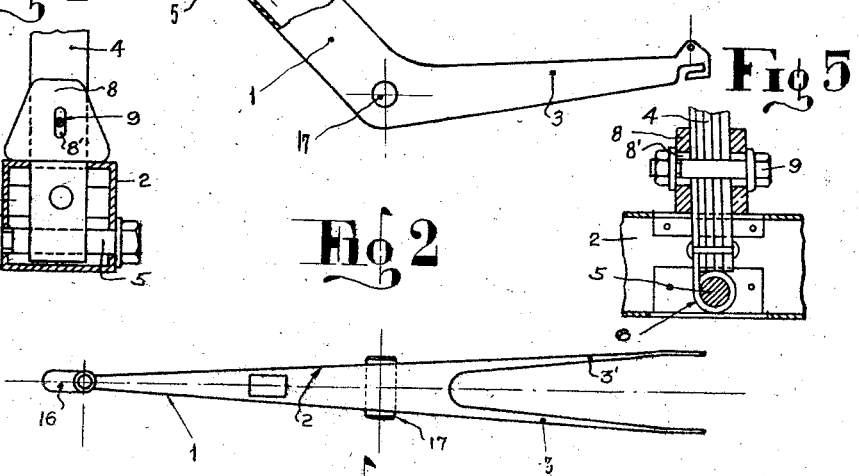
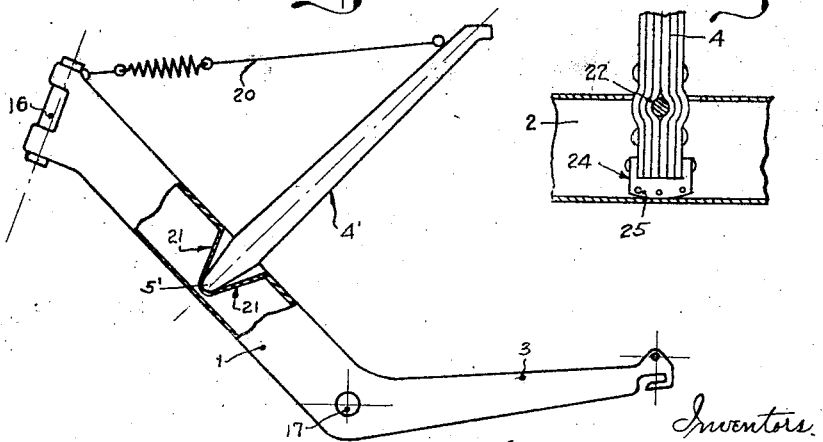
Inventors  
G. Umberto Cozzolino  
Guglielmo Condro Flores  
By Hemingway Jr. Atty.

Patented Apr. 13, 1926.

1,580,414

UNITED STATES PATENT OFFICE.

GIUSEPPE UMBERTO COZZOLINO AND GUGLIELMO CONDRÒ FLORES, OF TURIN, ITALY.

BICYCLE OR LIKE FRAME.

Application filed March 1, 1924. Serial No. 696,241.

*To all whom it may concern:*

Be it known that we, GIUSEPPE UMBERTO COZZOLINO and GUGLIELMO CONDRÒ FLORES, both subjects of the King of Italy, residents of 17 via Digione, Turin, in the Kingdom of Italy, and whose post-office address is 17 via Digione, Turin, Italy, have invented certain new and useful Improvements in Bicycle or like Frames; and we do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

The object of this invention is to provide an improved bicycle or like frame which shall be very strong but light and cheaper to manufacture than the ordinary tubular frame.

To the attainment of this object we make a bicycle or like frame by cutting out, pressing, bending over or similar operations performed on sheet metal.

The frame proper is comprised of two channel or C-shaped members formed from sheet metal and welded, brazed or otherwise united together, and it carries the steering head tube at one end and the crank axle bracket at a point between its ends.

A saddle support of novel construction is pivotally attached to the frame between the steering head tube and the crank axle bracket, and means are provided for retaining said support against angular movement about the pivot, said means being preferably adjustable in order to vary the inclination of the support and consequently the height of the saddle from the crank axle.

The support may be constituted by a leaf spring or it may be formed of sheet metal. In the first case the means for retaining it against angular movement may comprise either plates secured to the spring and adapted to bear on the frame, said plates being adjustable longitudinally; or a stirrup secured to the lower end of the support and having a number of openings through any one of which and a corresponding opening in the frame a pin or the like can be passed according to the angular position of the support. In the second case said means may comprise a spring tension member between the upper end of the support and the front portion of the frame or the steering head tube.

Constructional forms of the invention are illustrated on the accompanying drawings to which reference will now be made.

Fig. 1 is a side view and Fig. 2 a plan of one form of the frame and saddle support.

Fig. 3 is a side view showing a modification.

Figs. 4 and 5 are detailed views showing the attachment of the saddle support to the frame illustrated by Figs. 1 and 2.

Fig. 6 is a detail view showing another way of attaching the saddle support.

In the drawing the references 1 and 2 denote the two main parts constituting the frame. These parts, comprised of two symmetrical channel or C-shaped members pressed up from sheet metal, are united by brazing, welding or otherwise. The rear frame portion 3, which forms the fork for the back wheel, is strengthened by a plate welded along the edge 3'.

The steering head tube 16 is welded to the front of the frame and the crank axle bracket 17 is disposed about the middle of the frame.

That portion of the frame extending between the steering head tube 16 and the crank axle bracket 17 has a recess to accommodate the lower end of the saddle support.

As illustrated by Figs. 1, 2, 4 and 5, the saddle support consists of a leaf spring 4, the principal leaf of which is attached to a pivot pin 5 in the frame by means of an eye 6, while at the other end it is fitted with a sleeve 7 intended to receive the saddle pin. The spring is held against pivotal movement by two plates 8 attached to the spring by means of a bolt 9 and bearing on the surface of the frame. The opening 8' in the plates 8 (Figs. 4 and 5) through which the bolt passes, is elongated to allow of the plates being adjusted longitudinally of the support so as to vary the inclination of the spring and consequently the height of the saddle with respect to the crank axle bracket.

This arrangement of the saddle support affords sufficient elasticity to the saddle with only a slight variation in the radial distance of the saddle from the crank axle bracket 17 and from the handlebars of the bicycle.

The spring 4 can be rendered more or less rigid by joining together a certain number of the leaves by some suitable means, for example by aid of cramping vices or of screws fitted at —$a^1$—, —$a^2$—, —$a^3$—, —$a^4$—, etc.

In Fig. 6 the spring 4 is shown pivoted to the frame 1 by means of a bolt 22 which passes between the leaves of the spring, these latter being suitably shaped and riveted, while a stirrup 24 riveted to the spring is fixed to the frame by a bolt passing through the frame and through any one of the holes 25 made in the stirrup 24, according to the angular position of the spring.

In the arrangement according to Fig. 3 the spring 4 is replaced by a support 4' of pressed metal pivoted to the frame at 5' and connected elastically to the frame by a tension member 20. Oscillation of the support 4' is limited in amplitude by two shoulders 21 on the hollow frame members 1 and 2. If desired, the spring tension member 20 may be replaced by springs inserted between the shoulders 21 and the support 4'.

What we claim is:

1. A bicycle frame having a front fork mounting, a crank axle mounting, an inclined frame element extending between the mountings, and projecting approximately horizontally beyond the latter mounting, and a saddle support connected to said element between said mountings and having its upper end adapted to resiliently oscillate in the longitudinal plane of the frame under all conditions.

2. A bicycle frame comprising a front fork mounting, a crank axle mounting, an inclined frame element constructed of two C-shaped sheet metal members connected together in the form of a rectangular box, said element extending between the mountings and having a bifurcated extension projecting approximately horizontally beyond the latter mounting, and a saddle support connected to said elements between said mountings and having its upper end adapted to resiliently oscillate in the longitudinal plane of the frame under all conditions.

3. A bicycle frame having a front fork mounting, a crank axle mounting, an inclined frame element extending between the mountings and projecting approximately horizontally beyond the latter mounting, and a saddle support comprising an arm pivoted to said element between said mountings and having its upper end adapted to oscillate under all conditions of operation.

4. A bicycle frame having a front fork mounting, a crank axle mounting, an inclined frame element extending between the mountings and projecting approximately horizontally beyond the latter mounting, and a leaf spring saddle support connected to said elements between said mountings.

5. A bicycle frame having a front fork mounting, a crank axle mounting, an inclined frame element extending between the mountings and projecting approximately horizontally beyond the latter mounting, a leaf spring saddle support connected to said elements between said mountings and means to adjust the inclination of said support.

6. A bicycle frame having a front fork mounting, a crank axle mounting, a single inclined frame element extending between said mountings and continued as a fork beyond the latter mounting, and a leaf spring saddle support pivoted to said element between the mountings, and means to adjust said support by moving it about its pivot point.

In testimony that we claim the foregoing as our invention, we have signed our names.

G. UMBERTO COZZOLINO.
GUGLIELMO CONDRÒ FLORES.